United States Patent [19]
Kuhls et al.

[11] 3,956,000
[45] May 11, 1976

[54] FLUOROCARBON WAXES AND PROCESS FOR PRODUCING THEM

[75] Inventors: Jurgen Kuhls, Burghausen; Herbert Fitz, Burgkirchen; Peter Haasemann, Kastl, all of Germany

[73] Assignee: Hoechst Aktiengesellschaft, Frankfurt am Main, Germany

[22] Filed: Jan. 22, 1975

[21] Appl. No.: 543,166

Related U.S. Application Data

[63] Continuation-in-part of Ser. No. 379,647, July 16, 1973, abandoned.

[30] Foreign Application Priority Data

July 21, 1972 Germany............................ 2235885

[52] U.S. Cl. ............................ 106/270; 260/29.6 F; 526/17
[51] Int. Cl.² ...................... C08F 2/38; C08F 14/26; C08L 91/06
[58] Field of Search ................ 106/271; 260/29.6 F, 260/92.1

[56] References Cited
UNITED STATES PATENTS

| | | | |
|---|---|---|---|
| 2,496,978 | 2/1950 | Berry ............................. | 260/92.1 R |
| 3,088,941 | 5/1963 | Uhland........................... | 260/92.1 R |
| 3,105,824 | 10/1963 | Green et al...................... | 260/29.6 F |
| 3,142,665 | 7/1964 | Cardinal......................... | 260/92.1 R |
| 3,752,796 | 8/1973 | Mueller et al.................. | 260/92.1 R |

*Primary Examiner*—Theodore Morris
*Attorney, Agent, or Firm*—Connolly and Hutz

[57] ABSTRACT

Fluorocarbon wax dispersions are produced by telomerization of tetrafluoro-ethylene or mixtures of tetrafluoro-ethylene with other olefinic monomers. The stable wax dispersions and the pulverulent fluorocarbon waxes obtained are, inter alia, valuable additives for lubricants and polishes.

6 Claims, No Drawings

FLUOROCARBON WAXES AND PROCESS FOR PRODUCING THEM

The application is a continuation-in-part of application Ser. No. 379,647 filed July 16, 1973 by Jurgen Kuhls et al. now abandoned.

The present invention relates to a process for producing fluorocarbon waxes by telomerization of tetrafluoroethylene or monomer mixtures consisting of tetrafluoroethylene and other olefinic monomers. The invention also relates to stable fluoro-carbon wax dispersions and fluorocarbon wax powders having a mean molecular weight in the range of from 10,000 to 200,000.

In the art two principal manufacturing methods for fluorocarbon waxes have become known; i.e., manufacture by pyrolysis of fluoropolymers or telomerization of fluorine containing monomers in organic solvents.

The pyrolytic decomposition of fluoropolymers at temperatures above 400°C is described, for example, in U.S. Pat. No. 2,496,978, British Patent 1,047,768 and German Patent 1,049,099. This process has, however, several disadvantages. Owing to its manufacturing process the fluoropolymers used are very expensive so that a production by way of pyrolysis is only realizable if such polymers are obtained as waste products which cannot be used otherwise. A production of fluoropolymers with the aim of a subsequent pyrolytic degradation is not practicable for economical reasons. In the pyrolysis a considerable loss in yield cannot be avoided as it is impossible to perform the reaction under conditions solely giving waxy products, liquid and gaseous by-products being always obtained concomitantly. Moreover, a separation of hydrogen fluoride with all its drawbacks concerning corrosion of the reaction apparatus can never be fully avoided. Finally, the pyrolysis product is obtained in the form of compact blocks, lumps or cakes which have to be ground to the desired particle size.

To overcome the aforesaid difficulties it has been proposed to produce fluorocarbon waxes by telomerization of fluorine containing monomers at elevated pressure and elevated temperature in the presence of free radical initiators. In those cases in which the solvent simultaneously acts as telogen, low molecular weight waxes with less than 30 tetrafluoroethylene units in the molecule are exclusively obtained. Processes of this type are described in U.S. Pat. Nos. 2,411,158, 2,433,844, 2,559,628 and 2,562,547. U.S. Pat. No. 3,105,824 discloses a process in which the telomerization of tetrafluoroethylene is performed at a temperature in the range of from 75° to 200°C in 1,1,2-trichlorotrifluoro-ethane as solvent which is little active as telogen, with the addition of small amounts of a highly active telogen, for example methanol or methylcyclohexane. As compared to the processes mentioned above, this procedure has the advantage that the fluorocarbon wax can be transferred from the purely organic solvent phase into the water phase. To this effect, the suspensions of the fluorocarbon wax in 1,1,2-trichloro-trifluoroethane are admixed with water soluble emulsifiers, whereupon half of the solvent is distilled off and the remaining portion of the solvent is eliminated while water is gradually added with stirring of the mixture. This process is rather complicated because of the many process steps required and the necessary recovery and drying of the solvent. On principle, the process allows of the manufacture of aqueous dispersions of fluorocarbon waxes; however, only in a molecular weight range up to about 2,000.

It is not possible to produce by this process fluorocarbon waxes having a molecular weight in the order of from 30,000 to 200,000, which are particularly interesting for industrial application, as the suspension which is first prepared coagulates during preparation or thereafter within a short period of time.

This is obviously due to the rapid growth of the primary particles formed during the course of telomerization and especially during removal of the solvent due to the granulating effect known for such solvents. The addition of water soluble emulsifiers to the solvent phase and subsequent replacement of the organic solvent by water do not permit either the production of stable dispersions of fluorocarbon waxes.

The present invention provides a process for producing fluorocarbon waxes, which comprises telomerizing at a temperature in the range of from 0° to 40°C under a pressure of from 0 to 25 atm. gauge monomeric tetrafluoroethylene, optionally in admixture with 0.1 to 40 mole % of at least one comonomer of the formulae

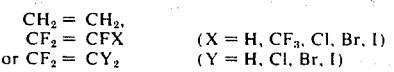

in the presence of from 0.1 to 15 % by weight, calculated on the monomer(s) used, of at least one telogen of the formula

in aqueous, weakly alkaline phase in the presence of initiators and emulsifiers as generally used for the polymerization in dispersion of tetrafluoroethylene, while applying a specific stirring energy in the range of from 2.4 . 10⁻⁵ to 4.5 . 10⁻⁵ kg m/sec/cc, preferably 2.4 . 10⁻⁵ to 3.5 . 10⁻⁵ kg m/sec/cc, to yield a stable fluorocarbon wax dispersion, optionally coagulating the said dispersion and drying the fluorocarbon wax obtained.

The process of the invention is carried out in a purely aqueous phase containing, besides the telogen, no organic solvent. Prior to the beginning of the reaction, the aqueous telomerization bath is rendered weakly alkaline by adding a corresponding amount of dilute aqueous ammonia solution (pH 7.1 to 9). On principle, the telomerization could also be carried out at pH values below 7, i.e., in the acid range, but in this case the stability of the resulting dispersion is reduced, and the diameter of the coagulating powder particles is increased, neither of which is desired.

The telomerization takes place in the presence of water soluble initiators and water soluble emulsifiers known and generally used for the homopolymerization in dispersion of tetrafluoroethylene. Suitable initiators having an appropriate decomposition half-life period in the indicated temperature range are, above all, known redox systems, for example ammonium persulfate/sodium bisulfite, ammonium persulfate/hydrazine, ammonium persulfate/ferrous salts, and ferric salts/sodium bisulfite. Suitable emulsifiers are especially ammonium or alkali metal salts of perfluorocarboxylic acids or ω-hydrofluorocarboxylic acids.

The telomerization is carried out at a pressure in the range of from atmospheric to 25 atmospheres gauge, preferably from 6 to 18 atm. gauge. The temperatures are in the range of from 0° to 40°C, preferably from 20° to 35 C°. It is essential to raise the specific stirring energy during the telomerization reaction by about 50 % on the average as compared with the homopolymerization of tetrafluoroethylene in aqueous dispersion under comparable pressure, temperature, and apparatus conditions. Otherwise the telomerization rate is lowered to such a degree that it is not suitable for an industrial process. The specific stirring energy must be therefore in the range of from $2.4 \cdot 10^{-5}$ to $4.5 \cdot 10^{-5}$ kg . m/sec/cc, preferably $2.4 \cdot 10^{-5}$ to $3.5 \cdot 10^{-5}$ kg m/sec/cc, while in the homopolymerization of tetrafluoroethylene it is in the range of approximately $1.2 \cdot 10^{-5}$ to $2 \cdot 10^{-5}$ kg . m/sec/cc.

It is of special advantage that the process of the invention can be carried out in the same apparatus as used for the industrial tetrafluoroethylene dispersion polymerization. As starting monomer tetrafluoroethylene is preferably used alone. It may also be used, however, together with comonomers of the formulae

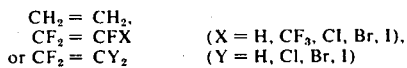

or with mixtures of such comonomers, the comonomers or monomer mixtures being used in an amount of from 0.1 to 40 mole %, preferably 1 to 15 mole %, calculated on the tetrafluoroethylen. Besides ethylene, especially suitable comonomers are trifluorochloroethylene, trifluoroethylene, trifluorobromoethylene, trifluoroiodoethylene, hexafluoropropylene, and 1,1-difluoro-2,2-dichloroethylene. Suitable telogens are compounds of the formulae

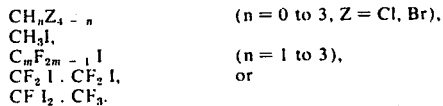

From among the said compounds, there are particularly mentioned dibromochloromethane, dichloromonobromomethane, methylene chloride, dibromodichloromethane, carbon tetrachloride, bromoform, methyl iodide, pentafluoroethyl iodide, perfluoroisopropyl iodide, 1,1-, and 1,2-di-iodotetrafluoroethane, chloroform giving especially good results. The said compounds can be used either individually or in the form of mixtures with one another. The telomerization is performed in the presence of 0.1 to 15 % by weight, preferably 0.4 to 10 % by weight, of telogen or telogen mixture, calculated on the amount of starting monomer or monomer mixture.

In general, the telogen or telogen mixture is added to the aqueous telomerization bath prior to the beginning of the reaction. As far as gaseous telogens are concerned they may also be mixed in a gas mixing device with the monomer or monomer mixture and the mixture passed into the telomerization autoclave at constant pressure. According to another method, the telogen can be added, separately from the monomer, with the aid of a micro-dosing device. By means of a cooling device connected with the dosing means gaseous or readily volatile telogens are then liquified.

In general, the reaction vessel is first charged with an aqueous phase containing the named additives. When, however, a fluorocarbon wax dispersion with larger particle size is desired a fluorocarbon wax dispersion obtained by the process of the invention can be used as seed dispersion. In this case the content of solid seeds in the aqueous phase should be in the range of from 0.3 to 3.0 %, preferably 0.5 to 2.0 % by weight, calculated on the total weight of the starting bath. The seed dispersion is preferably made from the same starting monomers with the aid of the same telogens as reacted in the main telomerization. It is likewise possible, however, to use a seed dispersion prepared according to the invention from different starting monomers and/or with other telogens without resulting dispersions of pulverulent fluorocarbon waxes having properties other than falling within the scope of the invention.

It was extremely surprising that the space-time-yield of the process of the invention is of the order of 150 to 300 g/l/h, i.e., the same order as obtained in the industrial polymerization of tetrafluoroethylene. It should have been expected that the presence of chain-transferring telogen compounds, as known from the art, would involve a slowing down of the reaction and a reduction of the space-time-yield.

The fluorocarbon wax dispersions obtained surprisingly have a very high stability. During telomerization and after termination thereof no coagulate formation is observed in spite of the more stringent stirring conditions. Hence, it is not necessary to add a coating agent as often used in the tetrafluoroethylene dispersion polymerization. The term "coating agent" is to be understood as a hydrocarbon anticoagulant, commonly paraffin waxes or white oils, as described in U.S. Pat. No. 2,612,484. The fluorocarbon wax dispersions are so stable that telomerization can be continued without difficulty to a solids content of up to 40 % by weight, calculated on the total weight of the dispersion. It is likewise possible, of course, to produce dispersions having very low solids contents. In general, however, a dispersion having a solids content of at least up to 5 % by weight, preferably up to 20 % by weight will be produced. Solids contents above 40 % by weight can be obtained by an after-treatment according to common methods of distillative concentration or electrocondensation.

Thus, the present invention also provides stable fluorocarbon wax dispersions containing spherical particles having a mean diameter of from 0.01 to 0.5 micron and a narrow size distribution expressed by the value $\Delta d\ 1/2/d_{av} < 0.35$.

The value $\Delta d\ 1/2/d_{av}$ is derived from the particle diameter distribution curve obtained by counting the measurable particle diameters in the image of the dispersion under the electron microscope. The value of the abscissa belonging to the curve maximum corresponds to the magnitude $d_{av}$. Parallel to the axis of the abscissa a straight line is laid through the center of the corresponding ordinate value and the distance between the intersections of the straight line with the two branches of the distribution curve is designated by $\Delta d\ 1/2$.

The mean diameter of the spherical dispersion particles is preferably in the range of from 0.03 to 0.2 micron, the value $\Delta d\ 1/2/d_{av}$ for the size distribution is preferably between $>0.20$ and $<0.35$.

The fluorocarbon wax dispersions obtained are subsequently coagulated, if desired, and the separated wax is dried to obtain a powder. On principle, the coagulation can be effected according to the usual methods, however, owing to the high stability of the dispersions obtained more stringent conditions have to be applied with regard to the means to be used, either chemical coagulating agents or mechanical energy. Coagulation can be brought about by the addition of acids to the dispersion, while stirring and adjusting the dispersion of a pH of from 6 to 2. For this purpose, concentrated hydrochloric acid is preferably used, but organic acids are also suitable, for example acetic acid. Instead of acids, precipitating electrolytes in the form of concentrated salt solutions may also be used, for example solutions of sodium chloride, ammonium chloride, ammonium carbonate, and potassium carbonate.

The use of an acid for coagulation is more advantageous in that by the subsequent neutralization of the coagulated dispersion with carbonates, particularly ammonium carbonate, an improved and more rapid separation of the precipitated pulverulent wax from the mother liquor is achieved under the action of $Co_2$ set free. After a short period of time, the wax floats on the surface and can be easily separated and washed by repeatedly adding water.

Coagulation of the dispersion may also be brought about by mechanical stirring with increased stirring energies of from 0.35 PS/l to 0.40 PS/l.

When the dispersion is coagulated by a method other than with an acid, it should be neutralized prior to coagulation if necessary.

The separated coagulate is dried preferably in a drying cabinet with air circulation or under vacuum at a temperature in the range of from 80° to 200°C, preferably 100° to 170°C.

In the known coagulation of polytetrafluoroethylene dispersions pulverulent dispersion polymers are obtained which consist of agglomerates of primary particles, the average diameter of such agglomerates being in the range of from 200 to 1,000 microns. Hence, it was absolutely surprising and could not be expected that the coagulation of the fluorocarbon wax dispersions obtained by the process of the invention yields powders of very fine particles with a mean size of the primary particles of from 0.5 to 6 microns, preferably 1 to 3 microns, which powders have novel properties.

Thus, the present invention further provides fluorocarbon wax powders having a mean molecular weight in the range of from 10,000 to 200,000, preferably 30,000 to 150,000 and being characterized by the above specified size of the primary particles and a size distribution of the primary particles expressed by the value $\Delta$ d $1/2/d_{av}$ of less than 0.9, measured as described above, more than 70 % of the said primary particles being associated to a loose grape-like conglomerate having a diameter of from 8 to 20 microns, by a specific surface of the primary articles of from 10 to 26 m²/g, measured by the Brunauer-Emmet-Teller (BET) method, by a total pore volume of the primary particles of from 80 to 120 cc/100 g of dry substance, by a second order transition temperature from crystalline to amorphous of 270° to 325°C and by an apparent melt viscosity of $0.7 . 10^2$ to $1 . 10^8$ poises at 380°C under 200 kg/cm².

The mean molecular weights are determined by a method in accordance with the disclosure of above-mentioned U.S. Pat. No. 2,562,547 (cf. particularly Examples 1, 2, and 7). In the telomerization reaction a telogen molecule is incorporated in the form of a terminal group into each macromolecular chain of the telomer. With the telogens used in the present case, chlorine, bromine and iodine atoms are incorporated into the chain. These halogen atoms (chlorine, bromine and iodine) can be readily determined in the fluorocarbon wax by known and common methods of elementary analysis. In the same way the fluorine content can also be determined which is in relation to the length of the carbon chain. The mean molecular weight of the telomer can be calculated from the proportion of the fluorine content to the content of the other halogens.

The size distribution of the primary particles d $1/2/d_{av}$ preferably ranges from more than 0.7 to less than 0.9, the transition temperature from crystalline to amorphous is preferably in the range of from 290° to 325°C, while the apparent melt viscosity preferably ranges from $1 . 10^3$ to $1.5 . 10^7$ poises (at 380°C under 200 kg/cm²).

The association of the primary particles of the pulverulent fluorocarbon waxes to larger grape-like conglomerates having a mean diameter of from 8 to 20 microns, preferably 10 to 15 microns, to an extent of more than 70 %, preferably 75 to 100 % with respect to the total number of primary particles can be determined with images under the electron microscope. Owing to this structure the pulverulent fluorocarbon waxes have a rather low tendency to dust formation, which is an annoying phenomenon in the processing of like fine particle materials. Hence, the powders can be dried without difficulty in drying cabinets with circulating air. The measurement of the total pore volume with the Hg-porosimeter (Model 65 of Messrs. Erben, Milan, Italy) is based on the following principle: for the penetration of mercury into a porous material a certain pressure is necessary, independent of the mean pore diameter. When the pressure is gradually raised all sized of pores are filled with mercury, one after the other. Besides a so-called pore spectrum, the total pore volume is determined by these measurements by integration via the absorbed amount of mercury. The measurements indicate for the fluorocarbon wax powders of the invention a total pore voume of 80 to 120, preferably 90 to 110 cc/100 grams of dry substance in a pressure range of 1 to 1,000 atmospheres with pore sizes of from 12.5 to 0.015 microns. As compared therewith, values of 50 to 60 cc/100 grams of dry substance were obtained with fluorocarbon waxes obtained by pyrolytic degradation under the same measuring conditions. Coagulates of dispersion polymers of tetrafluoro-ethylene have a total pore volume within the same range as waxes obtained by pyrolytic degradation.

The specific surface of the pulverulent fluorocarbon waxes according to the invention was determined by the BET method (S. Brunauer, P. H. Emmet, G. J. Teller J.Am.Chem.Soc. 60, 1938, page 309). Unexpectedly high values of 10 to 26 m²/g, preferably 12 to 20 m²/g were found. As compared therewith, waxes obtained by pyrolytic degradation have a specific surface of from 3 to 6 m²/g, even after grinding 10 fine particles of a mean diameter of about 6 microns. Dispersion polymers of tetrafluoroethylene, which are suitable for paste extrusion on account of their structure rich in pores, only reach values ranging from 7.6 to 9 m²/g.

Surprisingly, it was ascertained that with the use of high stirring forces (for example with a high speed stirrer of the type Ultra Turrax) with about 10,000 revolutions per minute, the pulverulent fluorocarbon waxes of the invention could be redispersed in organic dispersion media, such as perchloroethylene, toluene and benzene, to yield stable dispersions containing up to 20 % by weight of solid with a mean particle diameter of about 0.1 micron.

The fluorocarbon wax dispersions of the invention can be used for different applications. They are suitable for coating metal surfaces with sheetings of polytetrafluoroethylene, polytetrafluoro-ethylene copolymers and polytetrafluoroethylene compounds. As additive to polytetrafluoroethylene coating materials they improve the adherence to the substratum of such materials and reduce the number of pores in the coatings. Furthermore, they may be used for impregnating glass fibers and asbestos articles. They have a better penetration property than polytetrafluoroethylene dispersions and the advantages of a lower sintering temperature and lower melt viscosity. Stable fluorocarbon wax dispersions can be mixed with other aqueous dispersions of plastic materials, for example polyvinyl chloride, polytetrafluoroethylene and polystyrene dispersions. When dispersions of this type are coagulated the fluorocarbon wax particles are uniformly distributed in the coagulate, resulting in improved processing properties, for example as release agents. By replacement of the water the fluorocarbon waxes dispersions of the invention can be transferred into an organic solvent phase and are then suitable as dry lubricant spray or as lubricating lacquers in combination with other organic artificial resin solutions.

The pulverulent fluorocarbon waxes according to the invention are valuable additives for lubricants and polishes. Owing to their fine distribution in dispersion they can also be used as sprays having a lubrifying action or producing water and oil-repellent or corrosion resistant coatings. In intimate mixture with other plastic materials, for example polypropylene, polyamides, phenol resins, or epoxide resins, they can be used for the manufacture of self-lubrifying bearings in devices subject to friction. Fluoro-carbon waxes in the form of very fine powders are especially suitable as mould release agents, separating agents and lubricants in plastics processing and deep drawing of sheet metal. With all these applications the fineness of the fluorocarbon wax powder of the invention is of considerable importance, especially when they are used as additives for lubricants and for the manufacture of coatings and linings where the fineness of the particles brings about a much better homogeneity.

The following examples illustrate the invention.

EXAMPLES: General prescription a. Telomerization

To carry out telomerization an enameled 40 l autoclave with propeller stirrer was used. The autoclave was charged with 20 l of desalted water, wherein 17 g of perfluorooctanoic acid were dissolved and the pH of the solution was set at 8 – 9 by adding aqueous ammonia solution. The respective telogen was introduced into the autoclave with the aqueous bath, or added during telomerization in dosed quantities, either after having been mixed with the monomer in a gas mixing device or separately. After repeated flushing with nitrogen, the monomer or monomer mixture was forced into the autoclave, and after having reached the reaction temperature and switched on the stirrer, telomerization was started by adding 2.8 g of ammonium persulfate and 1.76 g of sodium bisulfite, in part dissolved in water.

b. Processing

The fluorocarbon wax dispersion obtained was diluted by the addition of water to a solids content of 10 to 20 % by weight, about 3 % by weight of concentrated hydrochloric acid were added and the batch was stirred in the telomerization vessel at a speed of 130 to 140 revolutions per minute. After neutralization of the hydrochloric acid with ammonium carbonate the coagulated product floated on top of the bath. The aqueous phase in the lower part of the autoclave was discharged through a bottom valve. The wax was washed three times by adding desalted water while stirring (20 revolutions per minute) and after each washing step the rapidly separating wash water was discharged. The moist powder remaining in the autoclave was spread on trays and dried in a drying cabinet with circulating air at a temperature of from 150° to 200°C.

In Tables 1 and 2 are summarized the starting monomers, the telogens, their mode of addition and the reaction conditions. The specific stirring energies were $3.0 \cdot 10^{-5}$ kg. m/sec/cc in the experiments summarized in Table 1 and $3.5 \cdot 10^{-5}$ kg m/sec/cc in the experiments of Table 2. The characteristics indicated in Table 3 were measured as described above or in the following manner: The mean size of the primary particles of the wax powder was determined by counting and measuring the particles visible in the electron microscopical image of the powder. The transition point from crystalline to amorphous was defined by differential thermoanalysis of powder samples.

To determine the melt viscosity the amount of melt extruded per unit of time was measured which issued at a given temperature under a given pressure from a nozzle with determined dimensions (diameter and length) and the apparent melt viscosity was calculated by the following equation:

$$\eta = \frac{P \cdot \pi \cdot r^4}{8 \cdot 1 \cdot q}$$

in which P stands for the extrusion pressure (dyn/cm$^2$) r is the radius of the nozzle (cm) l is the length of the nozzle (cm) and q is the amount of extruded material (cc/sec)

The melt extrusion was carried out with a high pressure capillary viscosimeter of Messrs. Gottfert (Germany) under the following measuring conditions (unless otherwise stated): 380°C, 200 kg/cm$^2$ extrusion pressure, nozzle dimensions : 1 mm diameter, 40 mm length. The extruded amount is given in cc per minute. The BET measurements were carried out with absorption of argon at −195°C. The stability of the fluorocarbon wax dispersions was measured by the coagulation time in a rotary viscometer of Messrs. Haake (Germany) with dispersions having a solids content of 20 %.

TABLE 1

Telomerization with mixing of the telogen with the monomer or monomer mixture in a gas mixing device

| Ex. No. | starting monomer(s) | telogen wt.% | atm. gage | temp. °C | proportion of seed, calc. on starting bath wt.% | solids content of dispersion wt.% | mean size of primary particles (wax powder (micron) | transition temperature cryst/amor. (wax powder °C) |
|---|---|---|---|---|---|---|---|---|
| 1 | 99.5 $CF_2=CF_2$ | 0.5 $CF_3$-$CF_2I$ | 19 | 32 | 0.8[2] | 22 | 6 | 324 |
| 2 | 98.8 $CF_2=CF_2$ | 1.2 $CF_3$-$CF_2I$ | 14 | 25 | — | 23 | 1.5 | 320 |
| 3 | 97.7 $CF_2=CF_2$ | 2.3 $CF_3$-$CF_2I$ | 17 | 34 | — | 27 | 2.0 | 319 |
| 4 | 96.3 $CF_2=CF_2$ | 3.7 $CF_3$-$CF_2I$ | 19 | 32 | — | 30 | 1.8 | 318 |
| 5 | 94.6 $CF_2=CF_2$ | 5.4 $CF_3$-$CF_2I$[1] | 19 | 32 | — | 35 | 1.7 | 317 |
| 6 | 90.2 $CF_2=CF_2$ | 9.8 $CF_3$-$CFI$-$CF_3$ | 19 | 32 | — | 28 | 1.5 | 310 |
| 7 | 88.0 $CF_2=CF_2$ | 12.0 $CF_3CFI$-$CF_3$ | 19 | 32 | 1.5[3] | 21 | 2.5 | 311 |
| 8 | 85.0 $CF_2=CF_2$ | 15.0 $CF_3$-$CFI$-$CF_3$ | 19 | 32 | — | 28 | 2.0 | 310 |
| 9 | 87.3 $CF_2=CF_2$/ 11.5 $CF_2=CFCl$ | 1.2 $CF_3$-$CF_2I$ | 17 | 32 | — | 20 | 1.2 | 299 |
| 10 | 84.5 $CF_2=CF_2$/ 8.0 $CF_2=CFCl$ | 7.5 $CF_3$-$CF_2I$ | 17 | 36 | — | 25 | 1.0 | 292 |
| 11 | 88.0 $CF_2=CF_2$/ 4.5 $CF_2=CH_2$ | 7.5 $CF_3$-$CF_2I$ | 17 | 32 | — | 25 | 1.1 | 271 |
| 12 | 80.5 $CF_2=CF_2$/ 12.0 $CF_3$-$CF=CF_2$ | 7.5 $CF_3$-$CF_2I$ | 17 | 32 | — | 20 | 1.5 | 318 |
| 13 | 86.7 $CF_2=CF_2$/ 4.5 $CF_3$-$CF=CF_2$ | 8.8 $CF_3$-$CF_2$-I | 17 | 32 | — | 20 | 1.5 | 315 |
| 14 | 92.0 $CF_2=CF_2$/ 6.0 $CF_2=CFBr$ | 2.0 $CF_3$-$CF_2I$ | 17 | 32 | — | 17 | 2.0 | 319 |
| 15 | 91.0 $CF_2=CF_2$/ 11 5.0 $CF_2=CFI$ | 4.0 $CF_3$-$CF_2I$ | 14 | 15 | — | 15 | 1.7 | 317 |
| 16 | 93.0 $CF_2=CF_2$/ 3.0 $CH_2=CH_2$ | 4.0 $CF_2J$-$CF_2I$ | 20 | 32 | 2.0[4] | 12 | 2.6 | 316 |

[1] added in portions during telomerization
[2] identical composition of seeds
[3] identical composition of seeds
[4] compositions of seeds same as in Example 4

TABLE 2

Telomerization with adding of the telogen to the aqueous starting bath

| Ex. No. | second monomer | telogen wt. % | atm. gage | temp. °C | proportion of seed, calc. on starting bath wt.% | solids content of dispersion wt.% | mean size of primary particles (wax powder (micron) | transition temperature cryst/amer. (wax powder °C |
|---|---|---|---|---|---|---|---|---|
| 1 | — | $CF_3$-$CF_2I$(0,8) | 17 | 32 | — | 24 | 2.5 | 321 |
| 2 | — | $CF_3$-$CF_2I$(2,4) | 14 | 25 | 1.5[2] | 28 | 4.5 | 317 |
| 3 | — | $CF_3$-$CF_2I$(4,4) | 14 | 32 | — | 34 | 1.2 | 307 |
| 4 | — | $C_2F_4Br_2$(3,9) | 17 | 32 | — | 17 | 3.0 | 327 |
| 5 | $CF_2=CFCl$(5) | $CCl_4$(1,0) | 14 | 32 | — | 20 | 1.5 | 318 |
| 6 | — | $CHBr_3$ (1,0) | 17 | 30 | — | 27 | 1.4 | 320 |
| 7 | — | $CHClBr_2$ (1,0) | 17 | 28 | — | 19 | 1.7 | 324 |
| 8 | — | $CF_3I$ (0,5) | 17 | 32 | — | 20 | 2.5 | 321 |
| 9 | — | $CHBrCl_2$(1,0) | 17 | 32 | — | 20 | 1.9 | 323 |
| 10 | — | $CHCl_3$(1,0) | 17 | 32 | — | 20 | 1.7 | 321 |
| 11 | $CF_2=CH_2$(5) | $CHCl_3$(1,0) | 14 | 28 | — | 18 | 1.8 | 318 |
| 12 | — | $CHCl_3$(3,7) | 14 | 28 | — | 20 | 2.2 | 319 |
| 13 | — | $CHCl_3$(4,5) | 14 | 28 | — | 18 | 1.8 | 318 |
| 14 | — | $CHCl_3$(8,0) | 14 | 25 | — | 20 | 1.3 | 315 |
| 15 | — | $CH_2Cl_2$(3,7) | 14 | 20 | 1.5[3] | 17 | 1.2 | 320 |
| 16 | $CF_2=CCl_2$(5) | $CHCl_3$(1,0) | 14 | 32 | — | 20 | 2.5 | 318 |
| 17 | — | $CHCl_3$(0,2) | 14 | 32 | — | 20 | 2.5 | 322 |

[1] balance to 100 from sum of wt.% of second monomer + wt.% telogen or wt.% telogen alone = wt.% of tetrafluoroethylene used.
[2] composition of seeds as in Example 5
[3] composition of seeds as in Example 14

TABLE 3

| Ex. No. | Table | rotoviscostability of dispersion min. sec. | | total pore volume cc/100 g | extrudate cc/min. | apparent melt viscosity poises | specific surface accord. to BET m²/g | distribution of primary particles $\Delta d\ 1/2/d_{ar}$ |
|---|---|---|---|---|---|---|---|---|
| 1 | 1 | 4' | 50" | 112 | 1,4 | 7200 | 15 | 0.8 |
| 2 | 1 | 5' | 20" | 114 | 1,4 | 5140 | 17 | |
| 3 | 1 | 5' | 40" | 117 | 2,5 | 2995 | 22 | |
| 4 | 1 | 4' | 30" | 112 | 3,0 | 2406 | 22 | |
| 5 | 1 | 6' | | 110 | 4,0 | 1800 | 16 | 0.75 |
| 6 | 1 | 10' | 20" | 116 | 45,0 | 160 | 18 | |
| 7 | 1 | 8' | 20" | 115 | 60,0 | 120 | 14 | |
| 8 | 1 | 20' | 30" | 113 | 75,0 | −96 | 19 | 0.85 |
| 9 | 1 | 15' | 10" | 117 | 3,0 | 2406 | 20 | |
| 10 | 1 | 16' | 25" | 115 | 44 | 165 | 23 | |
| 11 | 1 | 9' | 8" | 108 | 35 | 206 | 25 | |

TABLE 3-continued

| Ex. No. | Table | rotoviscostability of dispersion min. sec. | | total pore volume cc/100 g | extrudate cc/min. | apparent melt viscosity poises | specific surface accord. to BET m²/g | distribution of primary particles $\Delta$d 1/2/$d_{ar}$ |
|---|---|---|---|---|---|---|---|---|
| 12 | 1 | 9' | 10'' | 106 | 55 | 131 | 18 | |
| 13 | 1 | 7' | | 104 | 50 | 145 | 23 | |
| 14 | 1 | 4' | 20'' | 103 | 30 | 2406 | 17 | |
| 15 | 1 | 3' | 10'' | 101 | 2,5 | 2995 | 14 | |
| 16 | 1 | 5' | 30'' | 105 | 3,0 | 2406 | 22 | |
| 1 | 2 | 6' | 45'' | 107 | 1,0 | 7200 | 18 | 0.78 |
| 2 | 2 | 7' | 30'' | 107 | 10,0 | 720 | 22 | |
| 3 | 2 | 4' | 10'' | 104 | 100,0 | 72 | 23 | |
| 4 | 2 | 2' | 15'' | 102 | 0,3 | 2400 | 18 | |
| 5 | 2 | 8' | 10'' | 110 | 10,0 | 720 | 16 | 0.89 |
| 6 | 2 | 3' | 25'' | 104 | $8,04 \times 10^{-3}$ + | $3,05 \times 10^5$ | 22 | |
| 7 | 2 | 2' | 40'' | 105 | $8,76 \times 10^{-3}$ + | $28 \times 10^5$ | 21 | |
| 8 | 2 | 1' | 50'' | 101 | 1,4 | 5140 | 19 | |
| 9 | 2 | 2' | 35'' | 103 | $1,9 \times 10^{-3}$ + | $134 \times 10^5$ | 17 | |
| 10 | 2 | 2' | 45'' | 104 | 2,32 + | $1,1 \times 10^5$ | 15 | |
| 11 | 2 | 8' | 40'' | 110 | 0,51 + | $50 \times 10^3$ | 22 | |
| 12 | 2 | 4' | 40'' | 107 | 2,88 + | 9000 | 24 | |
| 13 | 2 | 25' | 10'' | 105 | 5,8 + | 4400 | 20 | 0.78 |
| 14 | 2 | 20' | 4' | 118 | 21,3 + | 1200 | 16 | |
| 15 | 2 | 6' | 50'' | 106 | 2,75 + | 9300 | 19 | |
| 16 | 2 | 2' | 50'' | 101 | 0,51 + | $50 \times 10^3$ | 21 | |
| 17 | 2 | 7' | 30'' | 108 | $2,17 \times 10^{-3}$ + | $113,4 \times 10^5$ | 16 | 0.88 |

+) 380°C, 7,3 kg/cm²; nozzle: diameter 2.08 mm; length 8 mm

What is claimed is:

1. Process for the manufacture of fluorocarbon waxes, having a mean molecular weight, determined by elementary analysis of terminal chlorine, bromine, or iodine atoms in relation to the fluorine, in the range of from 10,000 to 200,000, and an apparent melt viscosity of from $0.7 \cdot 10^2$ to $1 \cdot 10^8$ poises at 380°C under 200 kg/cm², by telomerization of tetrafluoroethylene or mixtures of tetrafluoroethylene with 0.1 to 40 mole % of at least one comonomer having the formula $CH_2 = CH_2$, $CF_2 = CFX$, where X is H, $CF_3$, Cl, Br, or I, or $CF_2 = CY_2$, where Y is H, Cl, Br or I, which comprises telomerizing without a coating agent at a temperature of from 0° to 40°C and a pressure of from 0 to 25 atmospheres gauge in the presence of from 0.1 to 15 % by weight, calculated on the monomer(s) used, of at least one telogen of the formula $CH_nZ_{4-n}$, $CH_3I$, $C_mF_{2m+1}I$, $CF_2I$-$CF_2I$, or $CFI_2$-$CF_3$, where n is zero or an integer of from 1 to 3, Z is Cl or Br and m is an integer of from 1 to 3, in aqueous weakly alkaline phase in the presence of initiators and emulsifiers known for the dispersion polymerization of tetrafluoroethylene, while applying a specific stirring energy in the range of from $2.4 \cdot 10^{-5}$ to $4.5 \cdot 10^{-5}$ kg . m/sec/cc, to obtain a stable fluorocarbon wax dispersion, coagulating the said dispersion and drying the fluorocarbon wax obtained.

2. The process of claim 1, wherein the telogen is added to the aqueous phase prior to the beginning of telomerization.

3. The process of claim 1, wherein the telogen is previously mixed with the monomeric tetrafluoroethylene or the monomer mixture in a gas mixing device and the mixture obtained is introduced into the aqueous phase.

4. The process of claim 1, wherein prior to telomerization the aqueous phase is admixed with fluorocarbon wax dispersion of a previous batch as seed dispersion, the proportion of seeds in the aqueous bath being in the range of from 0.3 to 3 % by weight, calculated on the total weight of the starting bath.

5. The process of claim 4, wherein the seed dispersion has been prepared from the same monomers and the same telogens as used for making the fluorocarbon wax.

6. A pulverulent fluorocarbon wax having a mean molecular weight determined by elementary analysis of terminal chlorine, bromine and iodine atoms in relation to fluorine in the range of from 10,000 to 200,000 with an average size of the primary particles of from 0.5 to 6 microns, more than 70 % of the said primary particles being associated to a loose conglomerate having a diameter of from 10 to 20 microns, a size distribution of the primary particles of more than 0.7 and less than 0.9 expressed by the magnitude $\Delta$d 1/2/day, a specific surface of the primary particles of from 10 to 26 m²/g, measured by the Brunauer-Emmet-Teller method, a total pore volume of the primary particles of from 80 to 120 cc/100 g of dry substance, a transition temperature from crystalline to amorphous of from 270° to 325°C, and an apparent melt viscosity of from $0.7 \cdot 10^2$ to $1 \cdot 10^8$ poises at 380°C. under 200 kg/cm².

* * * * *